(12) United States Patent
Minto et al.

(10) Patent No.: US 7,916,578 B2
(45) Date of Patent: Mar. 29, 2011

(54) SEISMIC WAVE GENERATION SYSTEMS AND METHODS FOR CASED WELLS

(75) Inventors: James Minto, Houston, TX (US);
Martin H Sorrells, Huffman, TX (US);
Thomas E. Owen, Helotes, TX (US);
Edgar C. Schroeder, San Antonio, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 275 days.

(21) Appl. No.: 12/122,671

(22) Filed: May 17, 2008

(65) Prior Publication Data
US 2009/0283355 A1 Nov. 19, 2009

(51) Int. Cl.
*G01V 1/40* (2006.01)
(52) U.S. Cl. .................. 367/189; 181/104; 181/106
(58) Field of Classification Search .............. 181/104, 181/106, 111, 105; 367/189
See application file for complete search history.

(56) References Cited

U.S. PATENT DOCUMENTS

| 4,682,308 | A | * | 7/1987 | Chung | 181/106 |
| 4,700,803 | A | * | 10/1987 | Mallett et al. | 181/106 |
| 4,702,343 | A | * | 10/1987 | Paulsson | 181/106 |
| 5,047,992 | A | * | 9/1991 | Howlett | 181/106 |
| 7,311,143 | B2 | * | 12/2007 | Engels et al. | 166/254.2 |
| 2006/0081413 | A1 | | 4/2006 | Minto | |
| 2007/0211572 | A1 | * | 9/2007 | Reiderman et al. | 367/35 |
| 2008/0042790 | A1 | | 2/2008 | Kim et al. | |

* cited by examiner

*Primary Examiner* — Ian J Lobo
(74) *Attorney, Agent, or Firm* — Jonna Flores; Darla Fonseca; Charlotte Rutherford

(57) ABSTRACT

A vibration source (10) includes an armature bar (12) having a major length dimension, and a driver (20A) positioned about the armature bar. The driver (20A) is movably coupled to the armature bar (12), and includes an electromagnet (40). During operation the electromagnet (40) is activated such that the driver (20A) moves with respect to the armature bar (12) and a vibratory signal is generated in the armature bar. A described method for generating a vibratory signal in an object includes positioning the vibration source (10) in an opening of the object, coupling the armature bar (12) to a surface of the object within the opening, and activating the electromagnet (40) of the driver (20A) such that the driver moves with respect to the armature bar (12) and a vibratory signal is generated in the armature bar and the object.

23 Claims, 8 Drawing Sheets

SEISMIC WAVE GENERATION SYSTEMS AND METHODS FOR CASED WELLS

STATEMENT REGARDING FEDERALLY SPONSORED RESEARCH AND DEVELOPMENT

This invention was made pursuant to contract no. DE-FG02-04ER84125 with the United States Department of Energy. The government retains certain rights to the invention.

CROSS REFERENCE TO RELATED APPLICATIONS

Not Applicable.

BACKGROUND

1. Field of the Invention

The invention relates generally to the field of seismic surveys conducted between wellbores drilled into the Earth's subsurface. More specifically, the invention relates to seismic energy sources for use in wellbores having a pipe or casing set therein.

2. Description of the Related Art

Oil and gas are typically obtained from the Earth's subsurface from wells drilled through subsurface rock formations. Oil and gas wells can range in depth from a few hundred feet to over 20,000 feet. In general, a well is made by drilling a hole in the Earth called a "wellbore." Sections of metal pipe connected together end-to-end form a "casing" that is positioned in the wellbore after drilling is completed. Once the casing is installed, cement is typically pumped down the casing and out through the bottom of the casing to fill the annular space between an inner surface of the wellbore and an outer surface of the casing. The cement exits the bottom of the casing and flows into the annular space between the wellbore and the casing as it moves back up toward the surface. When the cement hardens it forms a sealing bond between the inner surface of the wellbore and the outer surface of the casing. This sealing bond serves many purposes, including protecting oil and gas in reservoirs below the surface from contamination. Within the well, perforations are formed in the casing adjacent a rock formation containing oil and/or gas (a "reservoir"). These perforations allow the oil and/or gas to enter the casing from the reservoir. Once inside the casing, the oil and/or gas may be transported to the surface through a tubing that is inserted into the casing to a selected depth.

It is often desirable to obtain information about formations in the Earth surrounding a well. Such information may be used, for example, to target areas within underground formations most likely to produce oil and/or gas, thereby improving well production and reducing operating costs. One way to obtain information about formations in the earth surrounding a well is to use a source to generate seismic waves that pass through the geologic formations adjacent to the wellbore, and a receiver that receives at least a portion of the seismic energy. Transmission factors evidenced by the amount of time it takes the signal to travel from the source to the receiver, and/or the amplitude or phase of the received signal compared to that of the transmitted signal, are generally indicative of formations surrounding the wellbore. Such investigatory techniques are generally called "seismic" techniques.

Seismic evaluation methods known in the art include three-dimensional vertical seismic profiling (3-D VSP) and crosswell seismic tomography, and by using such techniques high resolution images regarding underground formations and fluids within underground reservoirs can be obtained. A vertical seismic profile (VSP) is typically acquired using at least one seismic signal source located on the Earth's surface near a wellbore and a receiver deployed in the wellbore. A 3-D VSP is typically acquired using a source triggered at multiple positions on the surface about a wellbore and multiple receivers positioned at different depths within the wellbore. A "reverse" 3-D VSP technique typically involves positioning multiple receivers on the surface about a wellbore and triggering a seismic source at one or more locations within the wellbore.

Crosswell seismic techniques generally include deploying a seismic source in one wellbore and a seismic receiver in another wellbore. Crosswell seismic techniques can generally provide higher resolution data than is possible with other techniques that deploy a source and/or receiver on the surface. Data acquired using crosswell techniques are advantageous in that the data can be directly referenced in depth, enabling accurate correlation of the data with, for example, conventional "well logging" data.

Currently available seismic signal sources designed for use in wellbores, and thus suitable for crosswell investigations, can generally be categorized as impulsive sources or swept frequency sources. Impulsive sources, such as air guns, sparkers and explosives, typically generate high amplitude signals of short duration (i.e., impulses). Due to their high amplitudes, impulsive sources can damage well casings and cement liners. As a result, impulsive sources are typically subject to minimum depth restrictions when used in wellbores.

Swept frequency sources are generally capable of producing cyclic signals over a range of frequencies, and are typically controlled to produce cyclic signals at frequencies that increase (or decrease) linearly with time. Currently available swept frequency sources generally fall into two categories: fluid-coupled sources and clamped sources. Fluid-coupled sources must be operated in fluid-filled wells, and thus find limited use in gas-filled wells. Fluid-coupled sources also typically produce signals of low amplitude, particularly at lower frequencies, and exhibit undesirable wave propagation in and along the wellbore. Clamped sources typically include mechanical and/or hydraulic clamping systems to securely couple the source to a well casing. Such clamping systems can damage well casings, and generally require complex surface support systems that create reliability problems and make clamping sources expensive to deploy.

BRIEF DESCRIPTION OF THE DRAWINGS

A better understanding of the various disclosed examples can be obtained when the detailed description is considered in conjunction with the following drawings, in which.

Figure 1:
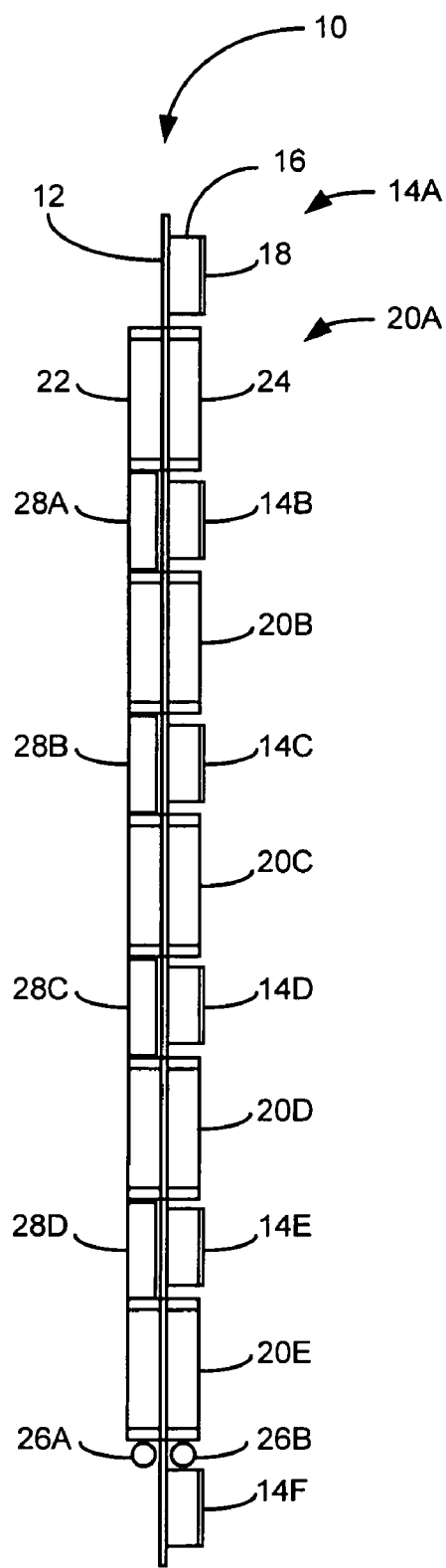
FIG. 1 is side elevation view of one example of a vibration source for generating a vibratory signal including an armature bar having a major length dimension and multiple clamp assemblies and drivers disposed along the armature bar.

While the invention is susceptible to various modifications and alternative forms, specific examples thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

A disclosed seismic vibration source includes an armature bar having a major length dimension, and a driver positioned about the armature bar. The driver is movably coupled to the armature bar, and includes an electromagnet. During operation the electromagnet is activated such that the driver moves with respect to the armature bar and a vibratory signal is generated in the armature bar. A described method for generating a vibratory signal in an object includes positioning the vibration source in an opening of the object, coupling the armature bar to a surface of the object within the opening, and activating the electromagnet of the driver such that the driver moves with respect to the armature bar and a vibratory signal is generated in the armature bar and the object.

FIG. 1 is a side elevation view of one example of a seismic vibration source 10 for generating a vibratory seismic signal, including an armature bar 12 having a major length dimension, multiple clamp assemblies 14A-14F and drivers 20A-20E disposed along the armature bar 12. In general, the vibration source 10 is adapted for use within an opening of an object. In the example of FIG. 1, the vibration source 10 is adapted for use in a vertical opening having a substantially circular cross section, such as a wellbore. As used herein, the term "wellbore" refers to a bore of a well, whether a tubular casing is positioned in the bore or not. As will become evident, the vibration source 10 of FIG. 1 is mechanically simple, robust, relatively easy to deploy, and unlikely to damage a cased and cemented wellbore during use.

In the example of FIG. 1, the clamp assemblies 14A-14F and the drivers 20A-20E alternate positionally along the armature bar 12. As explained in more detail below, each of the drivers 20A-20E is positioned about the armature bar 12, and is movably coupled to the armature bar 12.

In general, each of the drivers 20A-20E includes an electromagnet. During operation of the vibration source 10, the electromagnet of at least one of the drivers 20A-20E is activated such that the driver for which the associated electromagnet is actuated moves with respect to the armature bar 12 and a vibratory signal is generated in the armature bar 12.

In the example of FIG. 1, each of the drivers 20A-20E includes a pair of driver sections positioned on opposite sides of the armature bar 12. In FIG. 1, one of the driver sections of the driver 20A is labeled 22 and the other driver section of the driver 20A is labeled 24.

In general, each of the clamp assemblies 14A-14F is fixedly attached to the armature bar 12 and adapted to removably couple the armature bar to a surface of an object. In the example shown in FIG. 1, each of the clamp assemblies 14A-14F is configured similarly and can include an electromagnet for creating magnetic attraction between the electromagnet and an adjacent ferromagnetic object, for example, steel wellbore casing, thereby removably coupling the armature bar to a surface of the ferromagnetic object.

In the example of FIG. 1, each of the clamp assemblies 14A-14F includes a body and a replaceable foot. In FIG. 1, the body of the clamp assembly 14A is labeled 16 and the replaceable foot of the clamp assembly 14A is labeled 18. The body 16 includes the electromagnet, and the foot 18 is adapted to attain and maintain secure contact with the surface of the object. For example, the foot 18 can have a curved outer surface that corresponds to a curved inner surface of a ferromagnetic object (e.g., well casing), and the curved outer surface is configured to increase a clamping force and resultant friction between the curved outer surface of the foot 18 and the curved inner surface of the ferromagnetic object (e.g., the well casing).

Other types of clamping means are possible and are within the scope of the present invention. For example, one or more of the clamp assemblies 14A-14F may include one or more curved plate(s) for contacting a curved inner surface of an opening having a substantially circular cross section, and a mechanism for extending the plate(s) outwardly from the armature bar 12 and retracting the plate(s) inwardly toward the armature bar 12. A frictional force created when the plate(s) are extended and an outer surface of the plate contacts the inner surface of the opening may serve to securely couple the armature bar 12 to the inner surface of the opening.

In the example of FIG. 1, the armature bar 12 is a bar made out of a ferromagnetic material. In the example of FIG. 1, the armature bar 12 is a flat steel bar, which may be about 120 inches (3 meters) long, 2.5 inches (64 mm) wide, and 7/16 inches (10 mm) thick. The armature bar 12 thus can have a substantially rectangular cross section and two pairs of opposed sides. In general, the clamp assemblies 14A-14F are fixedly attached to one side of a pair of opposed sides of the armature bar 12, and the drivers 20A-20E are movably coupled to the pair of opposed sides of the armature bar 12.

The vibration source 10 of FIG. 1 also includes multiple supplemental masses 28A-28D positioned between, and coupled to, adjacent ones of the drivers 20A-20E. The supplemental masses 28A-28D are positioned adjacent a side of the armature bar 12 opposite the clamp assemblies 14A-14F. For example, as shown in FIG. 1, the supplemental mass 28A is positioned between, and coupled to, adjacent drivers 20A and 20B, and is positioned adjacent a side of the armature bar 12 opposite the clamp assembly 14B. In the example of FIG. 1, long support bars extend through the drivers 20A-20E and the supplemental masses 28A-28D, coupling the drivers 20A-20E and the supplemental masses 28A-28D together. Coupled to the drivers 20A-20E, the supplemental masses 28A-28D serve to increase a physical mass of an assembly including the drivers 20A-20E and the supplemental masses 28A-28D.

The major length dimension of the armature bar 12 is visible in FIG. 1. A centerline of the armature bar 12 passes through the armature bar 12 in a direction defined by the length dimension. In general, during operation of the vibration source 10, each of the drivers 20A-20E moves orthogonally with respect to the centerline of the armature bar 12. In the example of FIG. 1, the drivers 20A-20E are movable with respect to the armature bar 12. Coupled together by the support bars, the drivers 20A-20E and the supplemental masses 28A-28C move in unison such that an amplitude of the vibratory signal generated in the armature bar 12 is increased.

In the example of FIG. 1, the drivers 20A-20E and the supplemental masses 28A-28D are supported by a pair of roller bearings 26A and 26B attached to a lower end of the armature bar 12. An upper end of the armature bar 12 is adapted for attachment of a supporting structure such as a cable.

In general, the vibration source 10 of FIG. 1 includes two integrated but mechanically separate assemblies: a first assembly including the armature bar 12 and attached clamp assemblies 14A-14F, and a second assembly including the drivers 20A-20E and the supplemental masses 28A-28D attached to the support bars. As described in more detail below, during operation of the vibration source 10, the first assembly including the armature bar 12 is rigidly attached to a ferromagnetic well casing by the clamp assemblies 14A-14F. The electromagnet in at least one of the drivers 20A-20E is activated, causing the second assembly to move relative to the first assembly. As a result, a vibratory signal is generated in the armature bar 12 and in the well casing. The vibration source 10 of FIG. 1 is configured for producing vibratory signals over a broad range of frequencies.

The vibration source 10 of FIG. 1 has the desirable property of scalability. The length dimension of the vibration source 10 can easily be increased to allow more drivers, clamp assemblies, and/or supplemental masses to be added. With additional drivers and/or supplemental masses, the amplitude of the vibratory signal produced by the vibration source 10 is expectedly increased.

Figure 2:
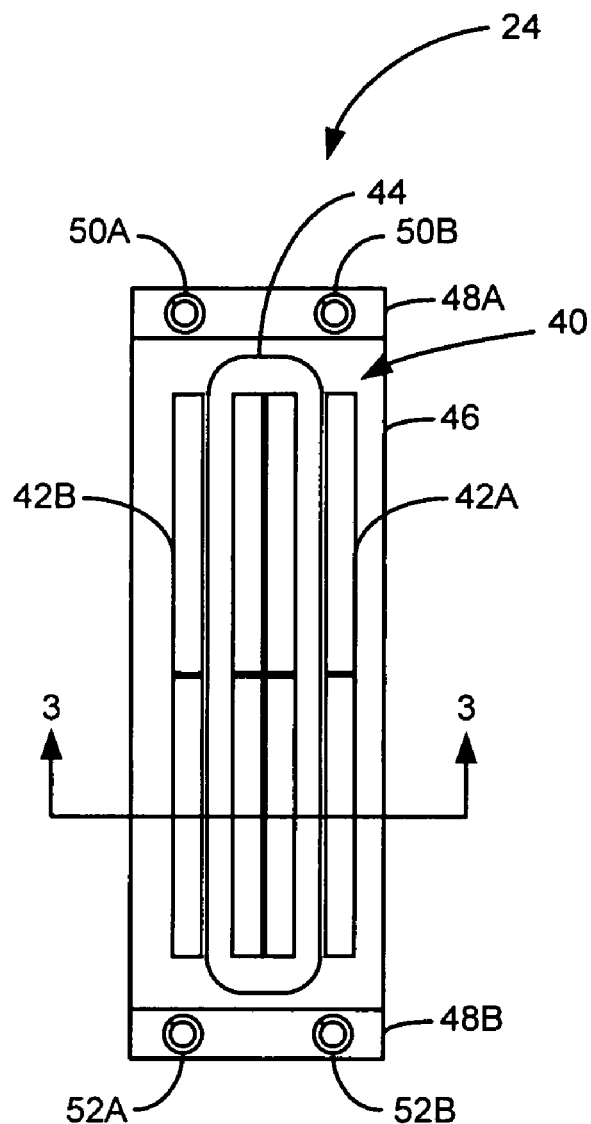
FIG. 2 is a side elevation view of a driver section of a driver of FIG. 1.

FIG. 2 is a side elevation view of the driver section 24 of the driver 20A of FIG. 1. In the example of FIG. 2, the driver section 24 includes an electromagnet 40. The electromagnet 40 includes two "U"-shaped cores 42A and 42B positioned side by side. Visible in FIG. 2 are substantially flat end faces (i.e., pole faces) of the "U"-shaped cores 42A and 42B. A winding 44 is positioned in and extends through recesses of the cores 42A and 42B. A reaction mass 46 is formed around the electromagnet 40 such that the reaction mass 46 is fixedly attached to the electromagnet 40. In the example of FIG. 2, the driver section 24 includes two end caps 48A and 48B positioned at opposite ends of the driver section 24.

In general, the driver section 24 includes a mounting mechanism for movably coupling the driver section 24 to the armature bar 12 (see FIG. 1). In the example of FIG. 2, the mounting mechanism includes two pairs of coil springs. One pair of coil springs 50A and 50B are positioned adjacent the end cap 48A as shown in FIG. 2, and another pair of coil springs 52A and 52B are positioned adjacent the end cap 48B.

The driver 20A of FIG. 1 is assembled by positioning the driver sections 22 and 24 on opposite sides of the armature bar 12 and fixedly attaching the driver sections to one another (e.g., via bolts or screws). The coil springs 50A, 50B, 52A, and 52B of the driver section 24 exert forces between the driver section 24 and the armature bar 12, and the two pairs of coil springs of the driver section 22 exert forces of repulsion between the driver section 22 and the armature bar 12. In this way, the driver 20A is positioned about the armature bar 12 and movably coupled to the armature bar 12.

In the example of FIGS. 1 and 2, all of the drivers 20A-20E can be configured similarly. That is, all of the drivers 20A-20E can have two driver sections, each including an electromagnet 40 having two "U"-shaped cores 42A and 42B positioned side by side, a winding 44 positioned in and extending through recesses of the cores 42A and 42B, a reaction mass 46 formed around the electromagnet 40 such that the reaction mass 46 is fixedly attached to the electromagnet 40, two end caps 48A and 48B positioned at opposite ends, and two pairs of coil springs for exerting forces of repulsion between the driver section and the armature bar 12.

Other types of mounting mechanisms for movably coupling the drivers sections to the armature bar 12 are possible and contemplated. In other examples, the mounting mechanisms may include other types of springs, such as leaf springs, or resilient members such as elastomer rings.

Figure 3:
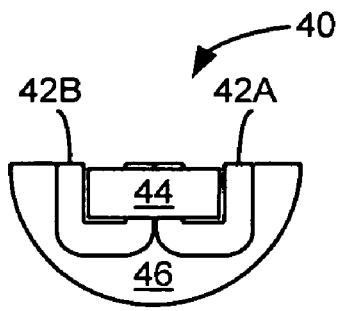
FIG. 3 is a cross-sectional view of the driver section of FIG. 2 as indicated in FIG. 2.

FIG. 3 is a cross-sectional view of the driver section 24 of FIG. 2. In the example of FIG. 3, an outer surface of the reaction mass 46 is curved to conform to an inner surface of an opening having a substantially circular cross section.

Figure 4:
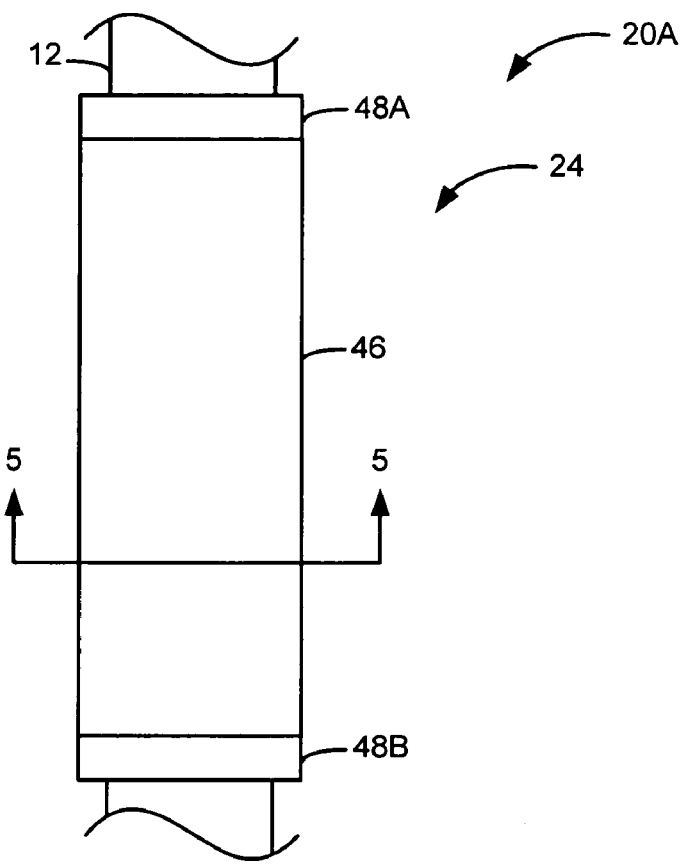
FIG. 4 is a side elevation view of a portion of the vibration source of FIG. 1 showing a driver positioned about the armature bar.

FIG. 4 is a side elevation view of a portion of the vibration source 10 of FIG. 1 showing the driver 20A positioned about the armature bar 12.

Figure 5:
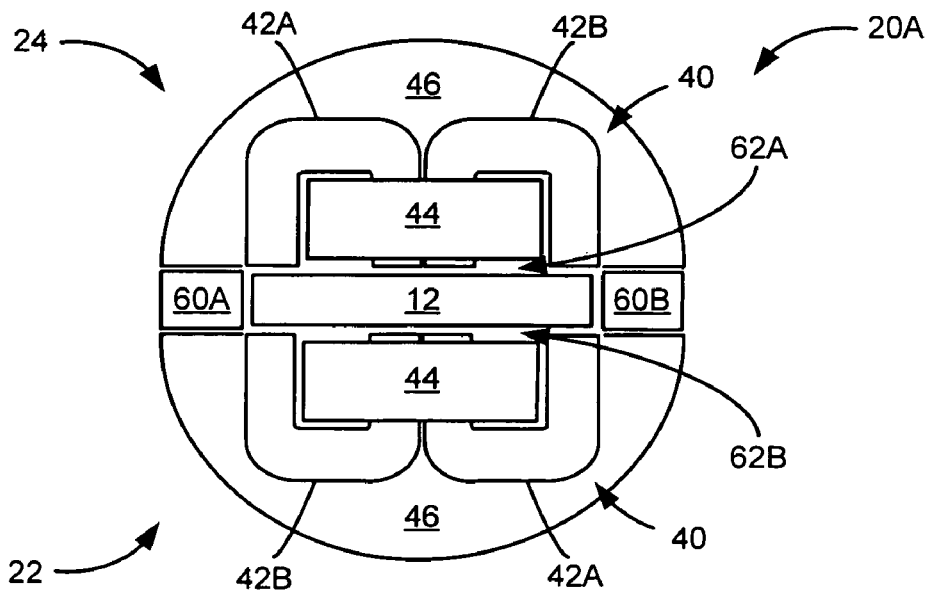
FIG. 5 is a cross-sectional view of the driver of FIG. 4 positioned about the armature bar as indicated in FIG. 4.

FIG. 5 is a cross-sectional view of the driver 20A of FIG. 4 positioned about the armature bar 12. The driver sections 22 and 24 of the driver 20A are positioned on opposite sides of the armature bar 12. A pair of spacer bars 60A and 60B are positioned between the reaction masses 46 of the driver sections 22 and 24, and the driver sections 22 and 24 are fixedly attached to one another (e.g., via bolts or screws). The coil springs 50A, 50B, 52A, and 52B of the driver section 24, and the similar coil springs of the driver section 22, exert forces of repulsion between the driver sections 22 and 24 and the armature bar 12 such that the driver 20A is positioned about the armature bar 12 and is movably coupled to the armature bar 12.

When the driver 20A is assembled as shown in FIG. 5, a spacing 62A (i.e., an air gap) exists between a side of the armature bar 12 adjacent the driver section 24 and the end faces of the "U"-shaped cores 42A and 42B of the electromagnet 40 of the driver section 24. A similar spacing 62B exists between a side of the armature bar 12 adjacent the driver section 22 and end faces of the "U"-shaped cores 42A and 42B of the electromagnet 40 of the driver section 22. The spacings 62A and 62B are attained by forces created by the coil springs of the driver sections 22 and 24.

The spacings 62A and 62B preferably have a known dimension such that amplitudes of vibratory signals produced in the armature bar 12 during operation of the vibration source 10 are predictable. In one example, the dimensions of the spacings 62A and 62B are preferably about 0.030 inches (0.75 mm).

In the example of FIGS. 2, 3, and 5, the windings of the electromagnets of the driver sections (e.g., the windings 44) may include, for example, multiple turns of insulated copper wire. The "U"-shaped cores of the electromagnets (e.g. the "U"-shaped cores 42A and 42B) may be, for example, silicon iron laminated cores. The reaction masses formed around the electromagnets (e.g., the reaction masses 46) are preferably made from a dense metal such as lead. The end caps of the driver sections (e.g., the end caps 48A and 48B) preferably include spring tension adjusters to set the spacings (i.e., the spacings 62A and 62B) between the end faces (i.e., pole faces) of the "U"-shaped cores of the electromagnets and armature bar 12.

Figure 6:
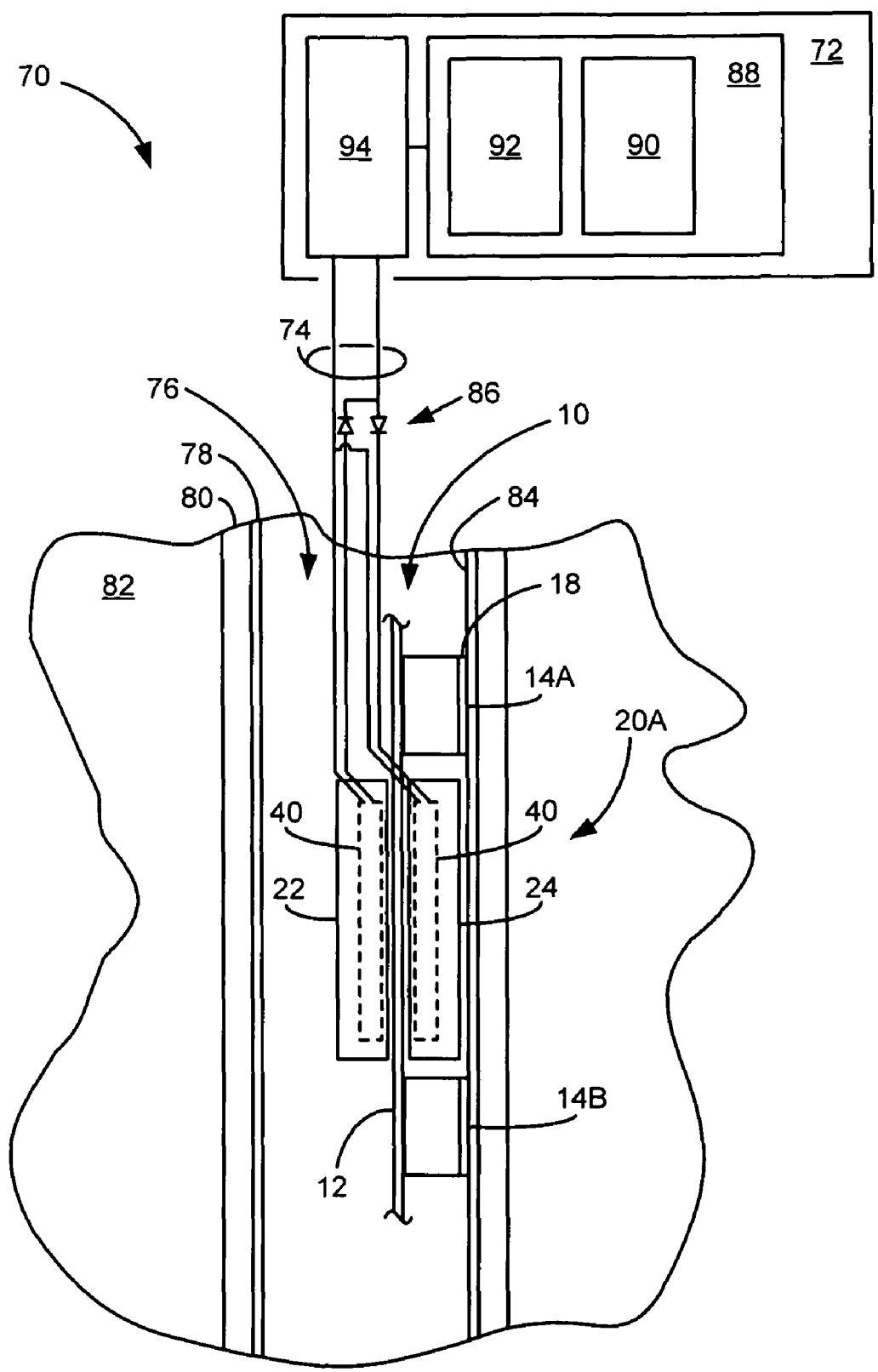
FIG. 6 is a side elevation view of a signal generation system, including the vibration source of FIG. 1, deployed in a wellbore.

FIG. 6 is a side elevation view of a signal generation system 70, including the vibration source 10 of FIG. 1, deployed in a wellbore 76. For simplicity, only a portion of the vibration source 10 of FIG. 1 is shown in FIG. 6. In the example of FIG. 6, the wellbore 76 includes a tubular casing 78 made of a ferromagnetic material. As is typical, the casing 78 may be made from heat-treated carbon steel. A cement layer 80 extends between an outer surface of the casing 78 and surrounding geologic formation 82.

In the example of FIG. 6, the signal generation system 70 includes a control unit 72 coupled to the vibration source 10 via an armored electrical cable referred to as a "wireline" and shown at 74. The illustrated control unit 72 includes a computer system 88 coupled to a drive voltage generator 94. The computer system 88 includes a monitor 90 for displaying system information and a keyboard 92 for receiving user input.

For simplicity, only two electrical conductors of the wireline 74 are shown in FIG. 6. The vibration source 10 is deployed in the wellbore 76 by attaching the vibration source 10 to the wireline 74 and lowering the vibration source 10 into the wellbore 76 via the wireline 74. When the vibration source 10 is disposed at a desired depth in the wellbore 76, the electromagnets of the clamp assemblies 14A-14F (see FIG. 1) are activated. For simplicity, only the clamp assemblies 14A and 14B are shown in FIG. 6. When the clamp assemblies 14A-14F are activated, the armature bar 12 is drawn toward, and securely coupled to, an inner surface 84 of the ferromagnetic casing 78. As described above, the feet of the clamp assemblies 14A-14F, including the foot 18 of the clamp assembly 14A, are adapted to achieve and maintain secure contact with the inner surface 84 of the casing 78.

A pair of diodes 86 is connected between a drive conductor of the wireline 74 and the driver sections 22 and 24 of the driver 20A. A common return conductor of the wireline 74 is connected to both the driver sections 22 and 24 of the driver 20A. When the control unit 72 signals the drive voltage generator 94 to apply a positive voltage between the drive conductor and the return conductor, a current flows through the electromagnet 40 of the driver section 24, and a force of magnetic attraction is exerted between the driver section 24 and the armature bar 12. As a result, the driver 20A and the armature bar 12 move toward one another. In FIG. 6, the driver 20A moves to the left, and the armature bar 12 moves to the right, exerting a force on the casing 78.

As described above, the armature bar 12 is securely coupled to the casing 78 by the clamp assemblies including the clamp assemblies 14A and 14B shown in FIG. 6. As the mass of the armature bar 12 and the casing 78 coupled to the armature bar 12 are greater than the mass of the driver 20A, the driver 20A moves a greater distance than the armature bar 12 and the casing 78.

When the control unit 72 signals the drive voltage generator 94 to apply a negative voltage between the drive conductor and the return conductor, a current flows through the electromagnet 40 of the driver section 22, and a force of magnetic attraction is exerted between the driver section 22 and the armature bar 12. As a result, the driver 20A and the armature bar 12 move toward one another. In FIG. 6, the driver 20A moves to the right, and the armature bar 12 moves to the left, exerting a force on the casing 78. Again, the armature bar 12 is securely coupled to the casing 78, and as the mass of the armature bar 12 and the casing 78 coupled to the armature bar 12 are greater than the mass of the driver 20A, the driver 20A moves a greater distance that the armature bar 12 and the casing 78.

When the control unit 72 signals the drive voltage generator 94 to alternately apply positive and negative voltages between the drive conductor and the return conductor, a vibratory signal is generated in the armature bar 12, and in the casing 78 coupled to the armature bar 12. This vibratory signal is transmitted to the surrounding geologic formation 82 via the cement layer 80 surrounding the casing 78.

Figure 7:
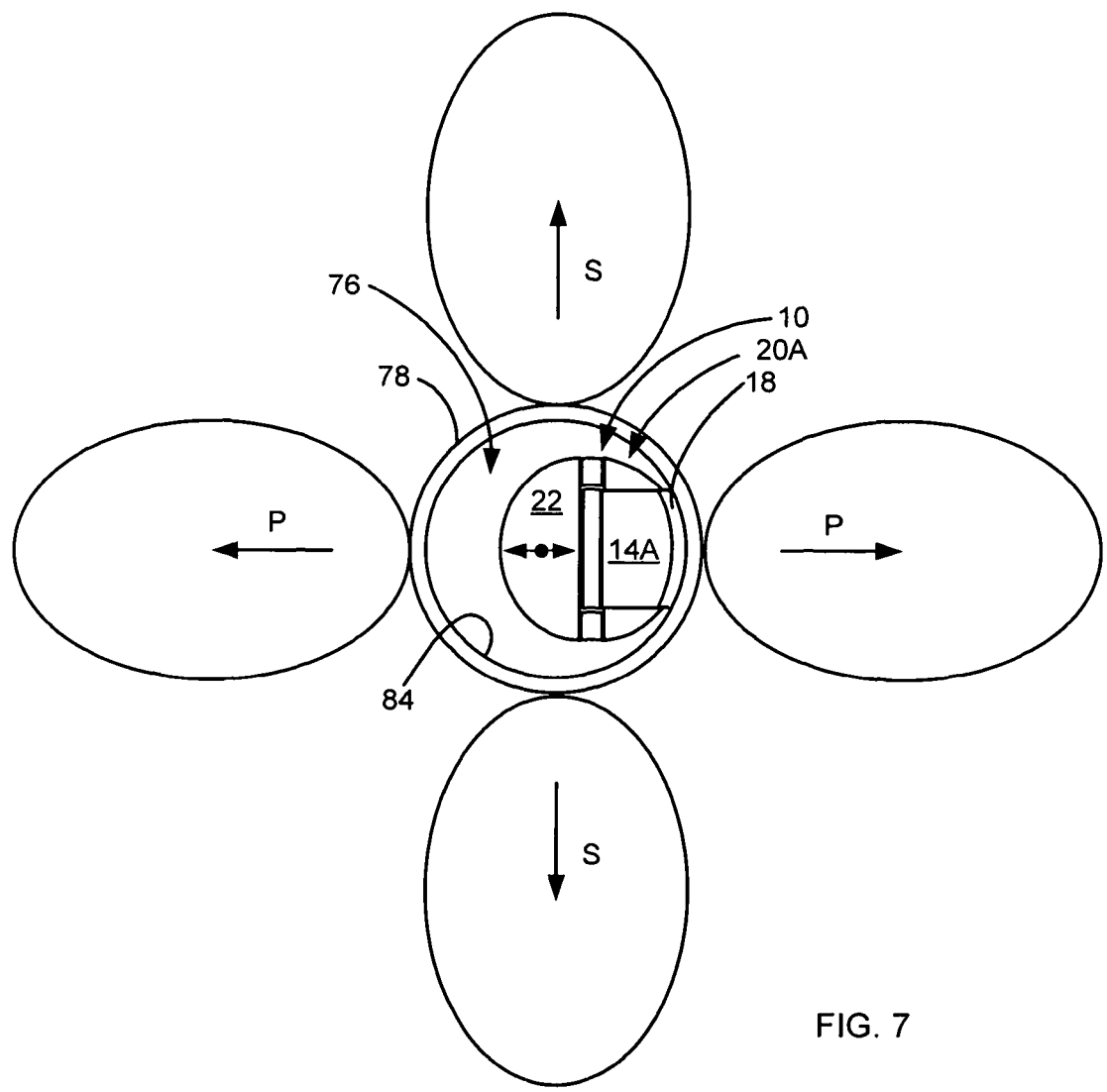
FIG. 7 is a top plan view of the vibration source of FIG. 6 during operation within the wellbore.

FIG. 7 is a top plan view of the vibration source 10 of FIG. 6 during operation within the wellbore 76. For simplicity, the control unit 72, the wireline 74, and the cement layer 80 are not shown in FIG. 7. FIG. 7 illustrates that during operation of the vibration source 10, compression (P) waves are generated and transmitted to the surrounding geologic formation in opposed first and second directions of motion of the driver 20A. Shear (S) waves are also generated and transmitted to the surrounding earth in opposed third and fourth directions, wherein the third and fourth directions are orthogonal to the first and second directions. The vibration source 10 can be oriented within the wellbore 76 to generate and transmit either compression (P) waves or shear (S) waves in a given direction (e.g., in a direction of a receiver).

Figure 8:
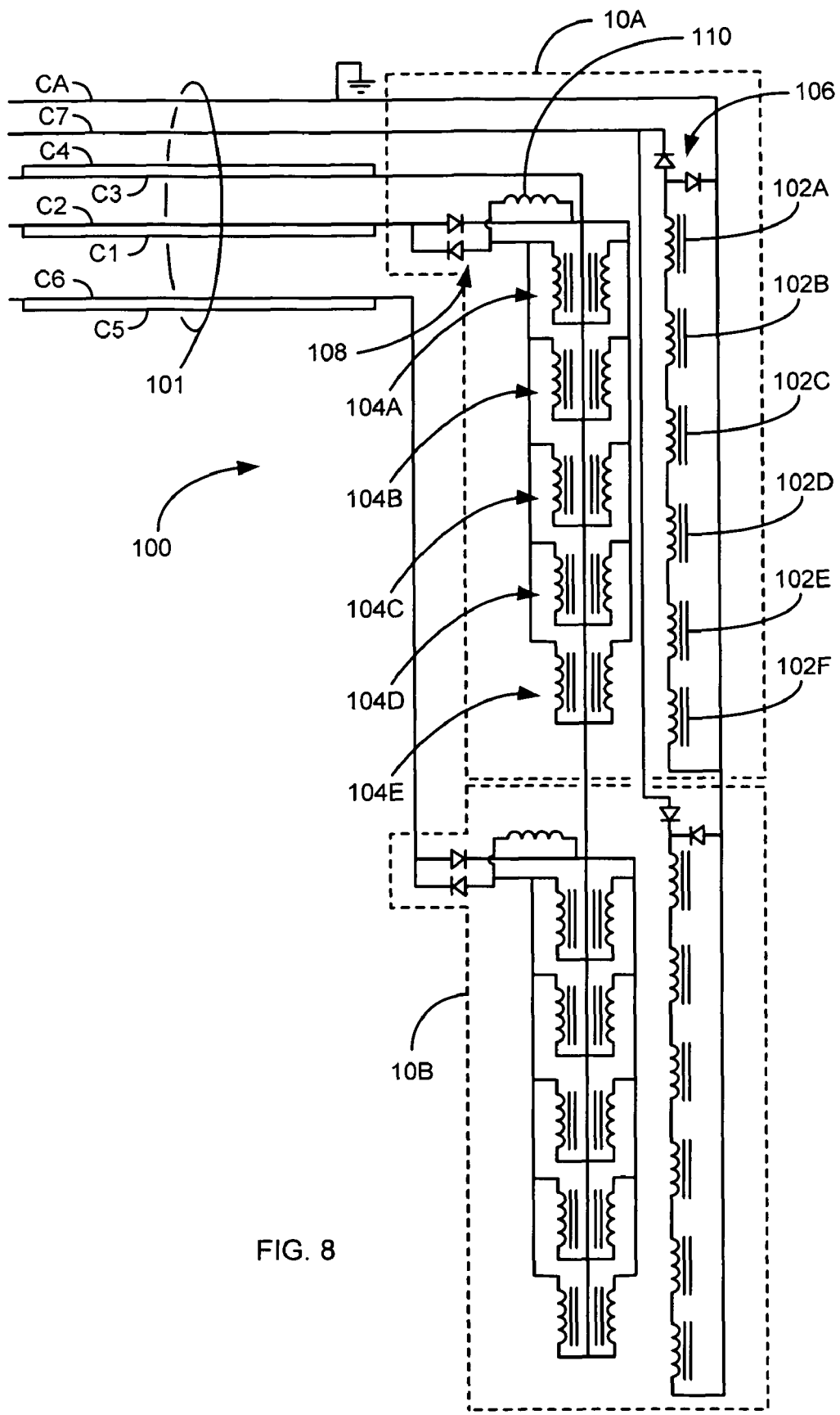
FIG. 8 is a electrical diagram of a signal generation system including two of the vibration sources of FIG. 1 connected to a wireline.

FIG. 8 is an electrical diagram of a signal generation system 100 including two of the vibration sources 10 of FIG. 1, labeled '10A' and '10B' in FIG. 8, connected to a wireline 101. The vibration sources 10A and 10B are deployed vertically with the vibration source 10A elevationally above the vibration source 10B. The vibration source 10A is oriented to produce compressional (P) waves in opposed first and second directions and shear (S) waves in opposed third and fourth directions, wherein the third and fourth directions are orthogonal to the first and second directions. The vibration source 10B is preferably oriented to produce shear (S) waves in the first and second directions and compressional (P) waves in the third and fourth directions.

In the example of FIG. 8, the wireline 101 includes seven conductors C1, C2, C3, C4, C5, C6, and C7, and an armor conductor CA. Ends of the conductors C1 and C2 are connected together as indicated in FIG. 8. Ends of the conductors C3 and C4 are similarly connected together, as are ends of the conductors C5 and C6.

In the vibration source 10A, windings 102A-102F form part of the electromagnets of the respective clamp assemblies 14A-14F of FIG. 1. As indicated in FIG. 8, the electromagnets 102A-102F of the clamp assemblies 14A-14F are connected in series. A pair of diodes 106 controls electrical current flow in the windings 102A-102F. When a negative voltage is applied between the conductors C7 and CA of the wireline 101, the electromagnets 102A-102F of the clamp assemblies 14A-14F are activated, and a force of magnetic attraction is exerted between the clamp assemblies 14A-14F and a nearby ferromagnetic object (e.g., a steel wellbore casing). As a result, the armature bar 12 of the vibration source 10A is drawn toward, and securely coupled to, a surface of the ferromagnetic object.

Pairs of electromagnet windings 104A-104E are part of the electromagnets of the respective drivers 20A-20E of FIG. 1. As indicated in FIG. 8, the windings 104A-104E of the drivers 20A-20E are connected in parallel. A pair of diodes 108 controls electrical current flow in the electromagnets 104A-104E. The conductors C1 and C2 are drive conductors, and the conductors C3 and C4 are return conductors.

When positive and negative voltages are alternately applied between the drive conductors C1 and C2 and the return conductors C3 and C4, a vibratory signal is generated in the armature bar 12 of the vibration source 10A, and in the ferromagnetic object coupled to the armature bar 12.

In the vibration source 10B, the electromagnets of the clamp assemblies 14A-14F are connected in series, and a pair of diodes control electrical current flow in the electromagnets. When a positive voltage is applied between the conductors C7 and CA of the wireline 101, the electromagnets of the clamp assemblies 14A-14F are activated, and a force of magnetic attraction is exerted between the clamp assemblies 14A-14F and a nearby ferromagnetic object (e.g., a steel wellbore casing). As a result, the armature bar 12 of the vibration source 10B is drawn toward, and securely coupled to, a surface of the ferromagnetic object.

As in the vibration source 10A, the electromagnets of the drivers 20A-20E of the vibration source 10B are connected in parallel. A pair of diodes control electrical current flow in the electromagnets. The conductors C5 and C6 are drive conductors, and the conductors C3 and C4 are return conductors.

When positive and negative voltages are alternately applied between the drive conductors C5 and C6 and the return conductors C3 and C4, a vibratory signal is generated in the armature bar 12 of the vibration source 10B, and in the ferromagnetic object coupled to the armature bar 12 of the vibration source 10B.

Figure 9:
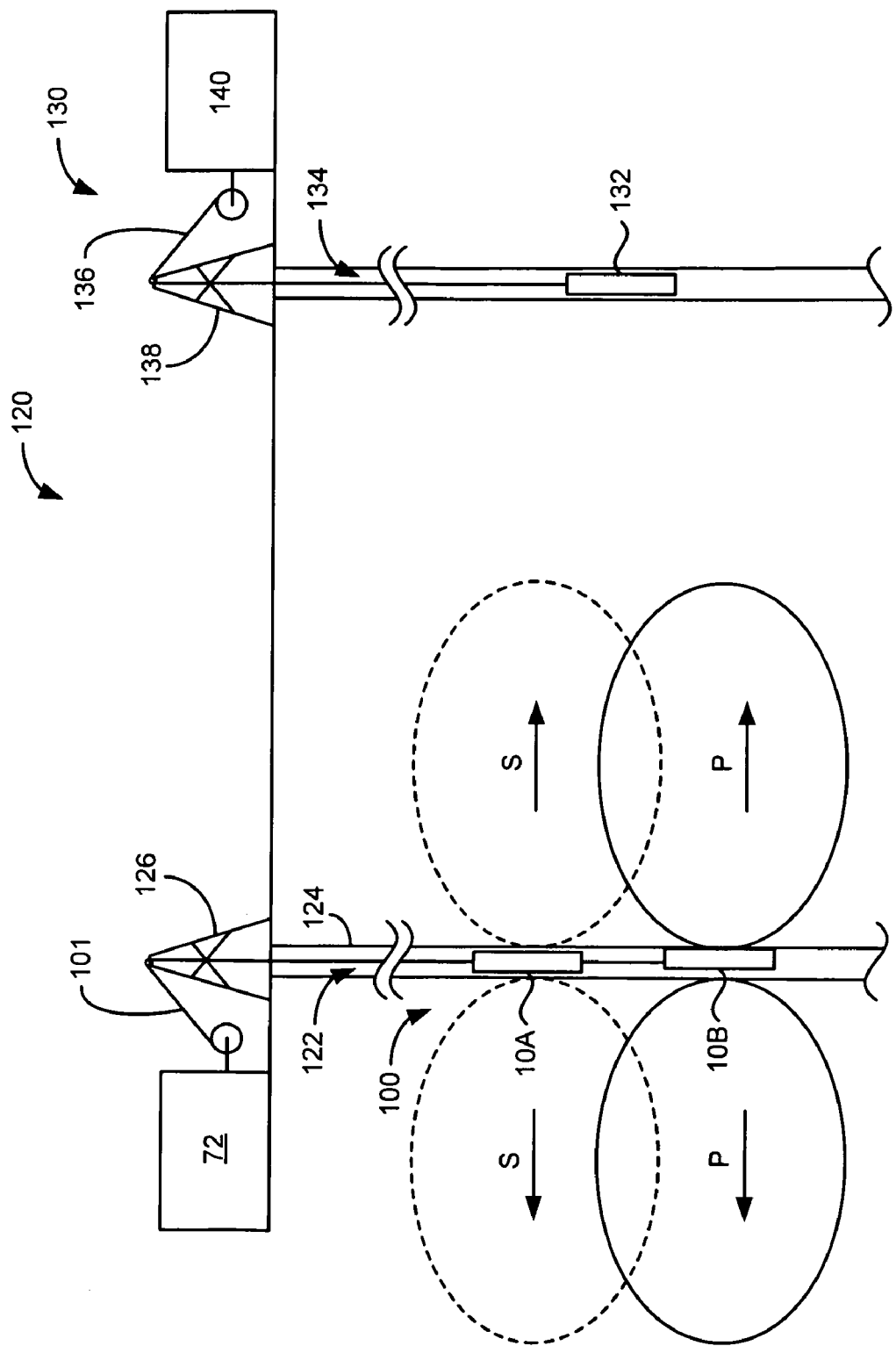
FIG. 9 is a diagram of a measurement system including the signal generation system of FIG. 8 deployed in and around a first wellbore, and a receiving system deployed in and around a second wellbore.

FIG. 9 is a diagram of a measurement system 120 including the signal generation system 100 of FIG. 8 deployed in and around a first wellbore 122 and a receiving system 130 deployed in and around a second wellbore 134. The measurement system 120 may be used to carry out, for example, a crosswell investigation of formations in the geologic formation between the wellbores 122 and 134.

As described above, the signal generation system 100 includes two vibration sources 10A and 10B connected to a wireline 101. (See FIG. 8). As illustrated in FIG. 9, the vibration sources 10A and 10B are attached to one end of the wireline 101 and suspended in the wellbore 122 via the wireline 101 and a supporting structure 126. The other end of the wireline is connected to the control unit 72 (see FIG. 6) which controls the signal generation system 100.

The vibration sources 10A and 10B are lowered into the wellbore 122 such that the vibration source 10A is elevationally above the vibration source 10B. At a desired depth in the wellbore 122, the clamp assemblies of the vibration sources 10A and 10B are activated, securely coupling the vibration sources 10A and 10B to an inside surface of a ferromagnetic casing 124 of the wellbore 122. The vibration source 10A is oriented to produce shear (S) waves in opposed first and second directions and compressional (P) waves in opposed third and fourth directions, wherein the third and fourth directions are orthogonal to the first and second directions. In FIG. 9, the first direction extends from the wellbore 122 in the direction of the wellbore 134. The vibration source 10B is oriented to produce compressional (P) waves the first and second directions and shear (S) waves in the third and fourth directions.

The receiving system 130 includes a receiver 132 suspended in the wellbore 134 using a wireline 136 and a supporting structure 138. The receiver 132 is attached to one end of the wireline 136, and is preferably securely coupled to an inside surface of the wellbore 134 at a desired depth within the wellbore 134. A control and recording unit 140 is attached to the other end of the wireline 136, and controls the receiver 132. The receiver 132 receives signals produced by the vibration sources 10A and 10B that pass through the geologic formation between the wellbores 122 and 134, including signals that are reflected from formations in the earth. In response to the signals, the receiver 132 produces electrical signals. The control and recording unit 140 receives and records the electrical signals produced by the receiver 132.

In one example, the vibration source 10A is operated first, followed by the vibration source 10B. As described above, each of the vibration sources 10A and 10B is adapted for producing vibratory signals over a range of frequencies from 40 to 600 Hz. In general, the control unit 72 controls the vibration sources 10A and 10B such that they produce vibratory signals at frequencies that increase (or decreasing) linearly with time, starting with a start frequency and ending with a stop frequency, thereby producing a "frequency sweep." Each frequency sweep is completed in a known period of time. In one particular example, each frequency sweep is completed in 5.6 seconds, and may be repeated a selected number of times.

The signal generation system 100 of FIG. 8 was field tested with the signal generation system 100 deployed in a first wellbore and a receiver deployed in a second wellbore. Data acquired during this testing showed that amplitudes of signals generated by the vibration sources 10A and 10B of the signal generation system 100 were about 20 decibels (dB) greater at the receiver than similar signals produced by a piezoelectric source known in the art at frequencies from about 100 Hz (the lower operating limit of the piezoelectric source) to approximately 400 Hz.

Figure 10:
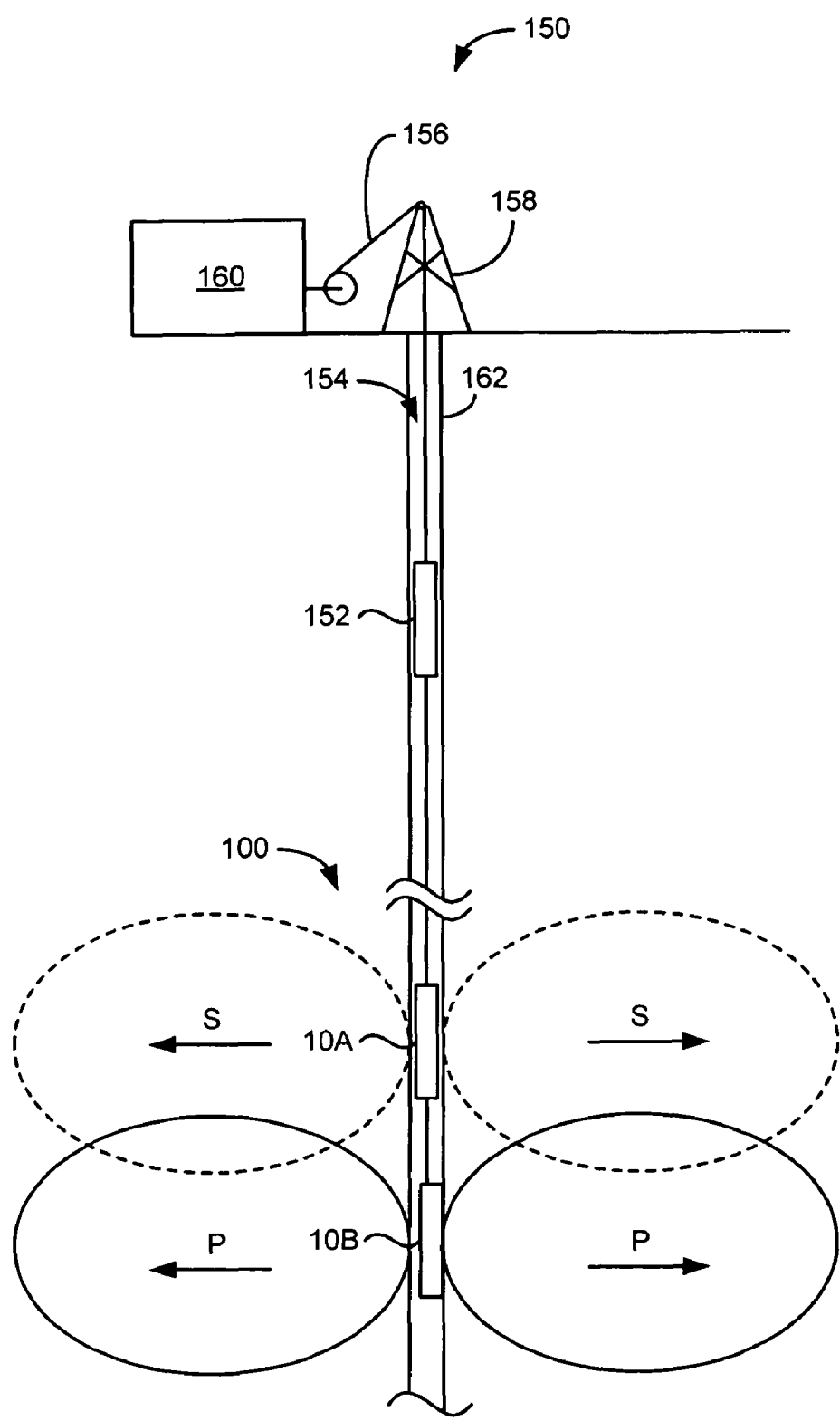
FIG. 10 is a diagram of a measurement system including the signal generation system of FIG. 8 and a receiver deployed in and around a wellbore.

FIG. 10 is a diagram of a measurement system 150 including the signal generation system 100 of FIG. 8 and a receiver 152 deployed in a wellbore 154. The measurement system 150 may be used to carry out, for example, an investigation of formations in the earth about the wellbore 154.

In the example of FIG. 10, the signal generation system 100 includes two vibration sources 10A and 10B attached to a wireline 156. A receiver 152 is also attached to the wireline 156. The vibration sources 10A and 10B and the receiver 152 are attached to the wireline 156 such that the vibration source 10A is elevationally above the vibration source 10B, a first desired distance is achieved between the receiver 152 and the vibration source 10A, and a second desired distance is achieved between the vibration source 10A and the vibration source 10B.

The vibration sources 10A and 10B and the receiver 152 are suspended in the wellbore 154 using the wireline 156 and a supporting structure 158. An opposite end of the wireline is connected to a control and recording unit 160. The vibration sources 10A and 10B and the receiver 152 are lowered into the wellbore 154, and at a desired depth in the wellbore 154, the clamp assemblies of the vibration sources 10A and 10B are activated, securely coupling the vibration sources 10A and 10B to an inside surface of a ferromagnetic casing 162 of the wellbore 154. The vibration source 10A is oriented to produce shear (S) waves in opposed first and second directions and compressional (P) waves in opposed third and fourth directions, wherein the third and fourth directions are orthogonal to the first and second directions. The vibration source 10B is oriented to produce compressional (P) waves in the first and second directions and shear (S) waves in the third and fourth directions.

The control and recording unit 160 controls the vibration sources 10A and 10B in a manner similar to the control unit 72 of FIG. 6. The receiver 152 receives signals produced by the vibration sources 10A and 10B and reflected from formations in the earth about the wellbore 154, and produces electrical signals in response thereto. The control and recording unit 160 receives and records the electrical signals produced by the receiver 152.

In one example, the vibration source 10A is operated first, followed by the vibration source 10B. As described above, each of the vibration sources 10A and 10B is adapted for producing vibratory signals over a range of frequencies from 40 to 600 Hz. In general, the control and recording unit 160 controls the vibration sources 10A and 10B such that they produce vibratory signals at frequencies that increase (or decrease) linearly with time, starting with a start frequency and ending with a stop frequency, thereby producing a frequency sweep. Each frequency sweep is completed in known period of time. In one particular example, each frequency sweep is completed in 5.6 seconds, and such sweep may be repeated a selected number of times.

A simple analysis was conducted to determine a likelihood of damage to a cemented wellbore during use of the vibration source 10 of FIG. 1. (The signal generation system 100 of FIGS. 8, 9, and 10 includes two such vibration sources 10A and 10B). The most likely damage to the cemented wellbore is tensile failure in the cement on a side of a casing opposite a direction of motion of the casing. To prevent such tensile failure, or failure of interface bonds, formation overburden preload stress on the side of the casing opposite the direction of motion must always be greater than stress relief caused by the moving casing. This constraint requires that the vibration source 10 must be operated at wellbore depths at which formation overburden pressure is greater than dynamic stress produced by the vibration source 10. The analysis revealed that the minimum operating depth of the vibration source 10 in a typical wellbore is 9.3 feet. This very modest minimum operating depth indicates that the likelihood of damage to cemented wellbores associated with operation of the vibration source 10 is very low.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vibration source, comprising:
   an elongate armature bar;
   a driver positioned about the armature bar, wherein the driver is movably coupled to the armature bar and comprises an electromagnet;
   a clamping unit adapted to removably couple the armature bar to a surface of an object; and
   wherein during operation the electromagnet is activated such that the driver moves with respect to the armature bar and a vibratory signal is generated in the armature bar.

2. The vibration source as recited in claim 1, wherein the vibration source is configured for use in a wellbore.

3. The vibration source as recited in claim 1, wherein the driver comprises a reaction mass fixedly coupled to the electromagnet.

4. The vibration source as recited in claim 1, further comprising at least one spring to movably couple the driver to the armature bar.

5. The vibration source as recited in claim 1, wherein the driver comprises a pair of driver sections positioned on opposite sides of the armature bar, and wherein the driver sections are fixedly attached to one another.

6. The vibration source as recited in claim 1, wherein the clamping unit comprises a securing electromagnet.

7. The vibration source as recited in claim 1, wherein the armature bar has a major length dimension and a centerline in a direction defined by the length dimension, and wherein during operation the driver moves orthogonally with respect to the centerline of the armature bar.

8. A vibration source, comprising:
   an elongate armature bar;
   a plurality of clamping units each configured to removably couple the armature bar to a surface of an object, wherein the clamping units are fixedly attached to the armature bar;
   a plurality of drivers each positioned about the armature bar, movably coupled to the armature bar, and comprising an electromagnet; and
   wherein during operation the electromagnet in at least one of the drivers is activated such that the driver with the activated electromagnet moves with respect to the armature bar and a vibratory signal is generated in the armature bar.

9. The vibration source as recited in claim 8, wherein the clamping units are disposed along a side of the armature bar.

10. The vibration source as recited in claim 8, wherein the clamping units and the drivers alternate positionally along the armature bar.

11. The vibration source as recited in claim 8, wherein at least one of the clamping units comprises a securing electromagnet.

12. The vibration source as recited in claim 8, wherein during operation at least one of the clamping units is activated such that the armature bar is removably coupled to the surface of the object, and the vibratory signal is generated in the armature bar and in the object.

13. The vibration source as recited in claim 12, wherein the object comprises a wellbore casing.

14. The vibration source as recited in claim 8, wherein each of the drivers comprises a reaction mass fixedly coupled to the electromagnet.

15. The vibration source as recited in claim 8, further comprising a plurality of springs that movably couple the drivers to the armature bar.

16. The vibration source as recited in claim 8, wherein each of the drivers comprises a pair of driver sections positioned on opposite sides of the armature bar, and wherein the driver sections of each of the drivers are fixedly coupled to one another such that each of the drivers is positioned about the armature bar.

17. The vibration source as recited in claim 8, wherein the armature bar has a major length dimension and a centerline in a direction defined by the length dimension, and wherein during operation the driver with the activated electromagnet moves orthogonally with respect to the centerline of the armature bar.

18. A method for generating a vibratory signal in an object, comprising:
   positioning a vibration source in an opening of the object, wherein the vibration source comprises an elongate armature bar and a driver positioned about the armature bar, and wherein the driver is movably coupled to the armature bar and comprises an electromagnet;
   coupling the armature bar to a surface of the object within the opening by operating a clamping unit adapted to couple the armature bar to a surface of an object, and wherein the clamping unit is fixedly attached to the armature bar; and
   activating the electromagnet of the driver such that the driver moves with respect to the armature bar and a vibratory signal is generated in the armature bar and the object.

19. The method as recited in claim 18, wherein the object comprises a wellbore casing.

20. The method as recited in claim 18, wherein the positioning comprises: attaching a vibration source to a wireline, wherein the vibration source comprises an elongate armature bar and a driver positioned about the armature bar, and wherein the driver is movably coupled to the armature bar and comprises an electromagnet; and lowering the vibration source into an opening of the object via the wireline.

21. The method as recited in claim 18, wherein the object comprises a ferromagnetic material and the clamping unit comprises a securing electromagnet, and wherein the coupling comprises:

activating the securing electromagnet such that the armature bar is coupled to a surface of the object within the opening.

22. The method as recited in claim 18, wherein the armature bar has a major length dimension and a centerline in a direction defined by the length dimension, and wherein the activating comprises:

activating the electromagnet of the driver such that driver moves orthogonally with respect to the centerline of the armature bar and a vibratory signal is generated in the armature bar and the object.

23. A method for generating a vibratory signal in an object, comprising:

positioning a vibration source in an opening of the object, wherein the vibration source comprises:

an elongate armature bar;

a clamping unit adapted to removably couple the armature bar to a surface of an object, wherein the coupling unit is fixedly attached to the armature bar;

a driver positioned about the armature bar, wherein the driver is movably coupled to the armature bar and comprises an electromagnet;

activating the clamping unit such that the armature bar is coupled to a surface of the object within the opening; and activating the electromagnet of the driver such that the driver moves with respect to the armature bar and a vibratory signal is generated in the armature bar and the object.

\* \* \* \* \*